T. J. McKENZIE.
TIRE CLEAT.
APPLICATION FILED JULY 16, 1910.
998,369.
Patented July 18, 1911.
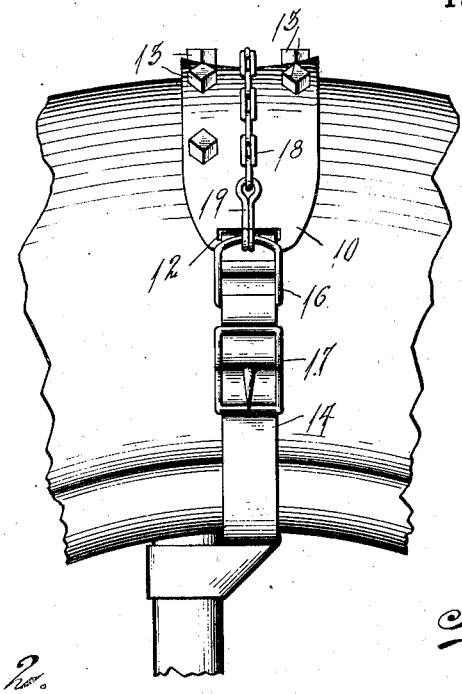
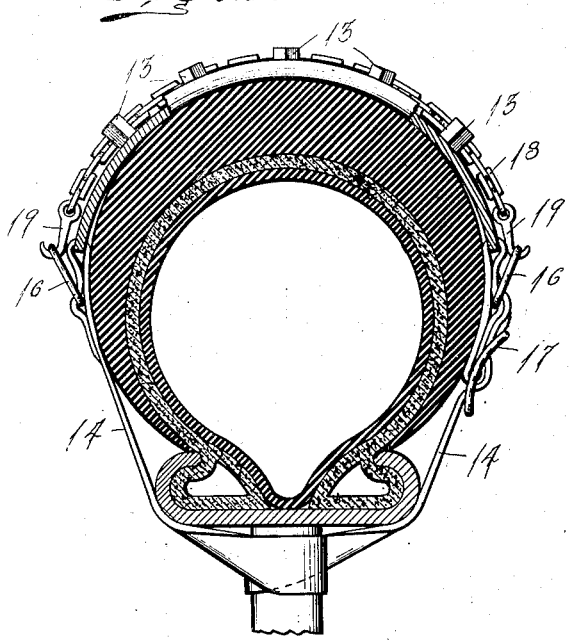
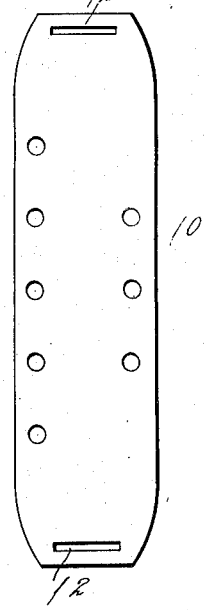
Inventor
Thomas J. McKenzie
Witnesses
By
Attorneys

UNITED STATES PATENT OFFICE.

THOMAS J. McKENZIE, OF BARBERTON, OHIO, ASSIGNOR OF ONE-FOURTH TO THOMAS G. PECK AND CLARANCE A. PECK, OF BARBERTON, OHIO.

TIRE-CLEAT.

998,369.  Specification of Letters Patent.  Patented July 18, 1911.

Application filed July 16, 1910. Serial No. 572,350.

*To all whom it may concern:*

Be it known that I, THOMAS J. MCKENZIE, a citizen of the United States, residing at Barberton, in the county of Summit, State of Ohio, have invented certain new and useful Improvements in Tire-Cleats; and I do hereby declare the following to be a full, clear, and exact description of the invention, such as will enable others skilled in the art to which it appertains to make and use the same.

This invention relates to anti-skid devices for automobile wheels and the like.

The principal object of the invention is to provide an anti-skid device in the nature of an arcuate tire embracing plate the tread surface of which is concave from end to end, a link chain lying in the valley of this tread surface and being swingable therein for clearing itself of accumulations, there being lugs arranged adjacent to the longitudinal edges of the plate which do not contact at any time with the chain during movement of the latter so that neither the chain nor lugs are worn by contact one with the other, and thus the long life and durability of this anti-skid device promoted over similar devices of this character.

With the above object in view the invention consists in certain novel details of construction and combination of parts hereinafter fully described and claimed, it being understood that various modifications may be made in the minor details of construction within the scope of the appended claim.

In the accompanying drawing forming part of this specification:—Figure 1 is a side elevation of a portion of an automobile wheel equipped with my improved anti-skid device. Fig. 2 is a cross section through the wheel rim and tire with my improved anti-skid device applied thereto. Fig. 3 is a plan view of the metallic plate used in connection with the device, the view showing the plate prior to being bent to conform to the tire.

Referring now to the drawing in which like characters of reference designate similar parts, 10 designates a metallic plate which is bent arcuate in contour to conform to the transverse curvature of the wheel tire, this plate being further formed with a tread face which is concave from edge to edge of the plate and forms a chain seat. The plate is provided adjacent to its opposite ends with transverse slots 12. The plate is furthermore provided with a series of lugs 13 which are preferably secured to the plate by riveting the heads of the lugs being preferably square in outline. Secured in each of the slots 12 is one end of a strap 14 and these straps are each provided adjacent the point of attachment with rings 16 fixed securely to the straps. One of the straps 14 is provided with a usual buckle 17 while the remaining strap has a spaced series of holes to receive the tongue of said buckle such as is common in devices of this character.

The lugs 13 are arranged in parallel rows, the rows extending longitudinally of the plate, and further being placed adjacent to the longitudinal edges of the plate as clearly shown in Fig. 1. A link chain 18 is disposed in the valley of the concave tread surface, and is provided at its opposite ends with hooks 19 which engage in the ring 16 above mentioned, these hooks detachably and pivotally mounting the chain for slight swinging movement in the valley of the plate. The swinging movement of the chain is limited by the outwardly curving longitudinal sides of the valley and thereby contact with and consequential mutual erosion of the lugs and chain is positively prevented. Both the chain and lugs engage the road bed when the vehicle wheel is in motion and prevent skidding of the wheel, while at the same time the chain due to its slight swinging movement in the valley of the plate tread surface clears itself constantly of accumulations.

When it is desired to attach the device to a tire the plate 10 is placed on the tire and the straps 14 brought around the rim and wrapped about one of the spokes as clearly shown in Figs. 1 and 2, and then buckled. If it is not necessary to use the chain the same may be detached by slackening the straps and pulling them in the direction of the plate when the hooks 19 can be readily disengaged from the ring 16.

What is claimed, is:—

An anti-skid device including an arcuate plate adapted to embrace a tire transversely and having a tread face concave from edge to edge of the plate and forming a chain seat, lugs arranged adjacent to the longitudinal edges of said chain seat, means for securing said plate to a wheel tire, and a link chain lying in the valley of said concave chain seat having terminal hooks removably and pivotally engaging said securing means, said chain being swingable bodily to a slight degree in said concave seat whereby the chain constantly clears itself of accumulations, the movement of the chain being limited by contact with the outwardly curving longitudinal sides of said seat valley whereby contact with and consequential mutual erosion of the lugs and chain when under load is positively prevented.

In testimony whereof, I affix my signature, in presence of two witnesses.

THOMAS J. McKENZIE.

Witnesses:
  WILLIAM SPADE,
  WILLIAM T. LITTRICK.